May 28, 1929.  V. MAUCK  1,715,040
COMBINATION HOUSE HEATING AND HOT WATER DISPENSING SYSTEM
Filed Sept. 24, 1926  4 Sheets-Sheet 1
FIG. I.
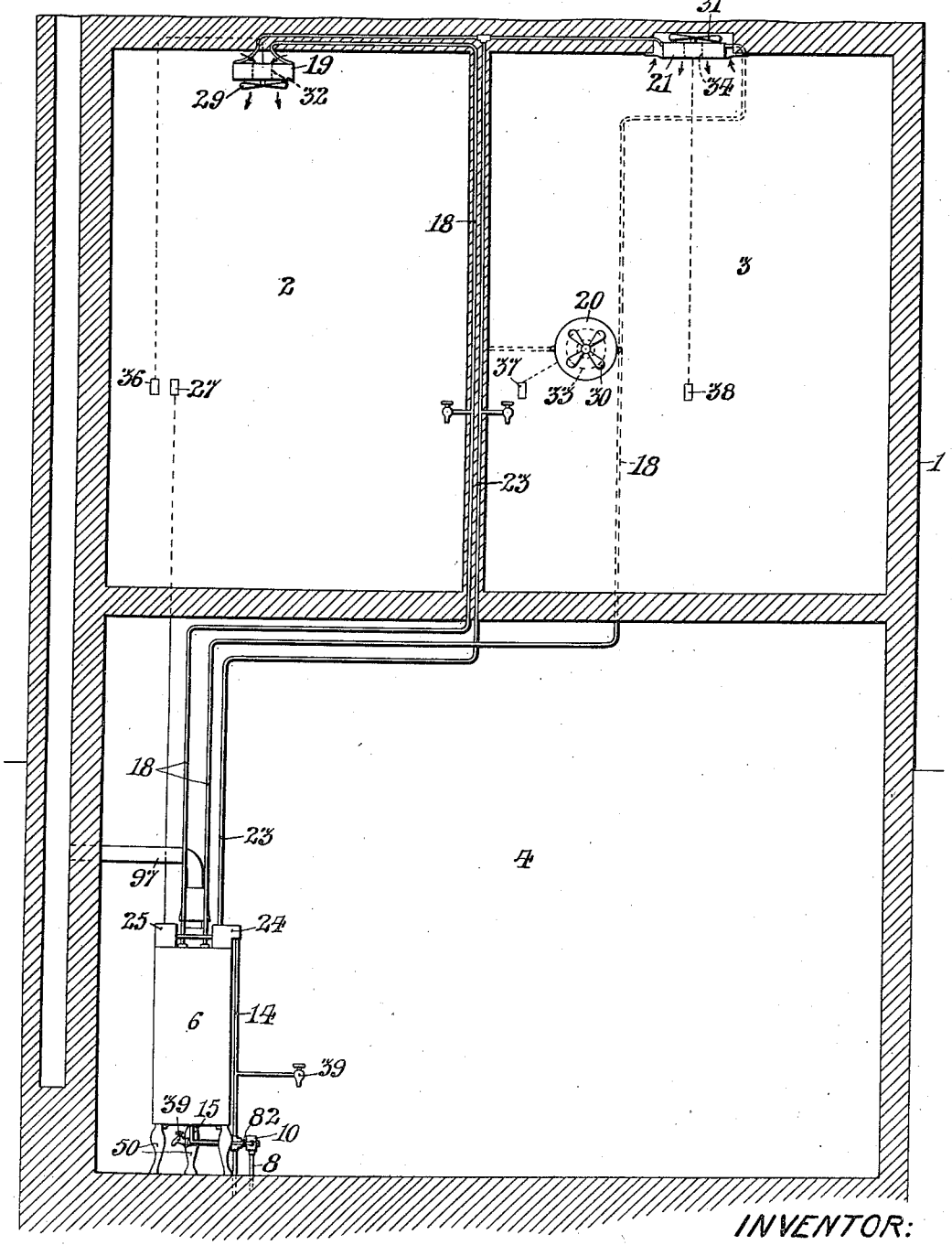
INVENTOR:
VICTOR MAUCK, May 28, 1929.  V. MAUCK  1,715,040
COMBINATION HOUSE HEATING AND HOT WATER DISPENSING SYSTEM
Filed Sept. 24, 1926  4 Sheets-Sheet 2
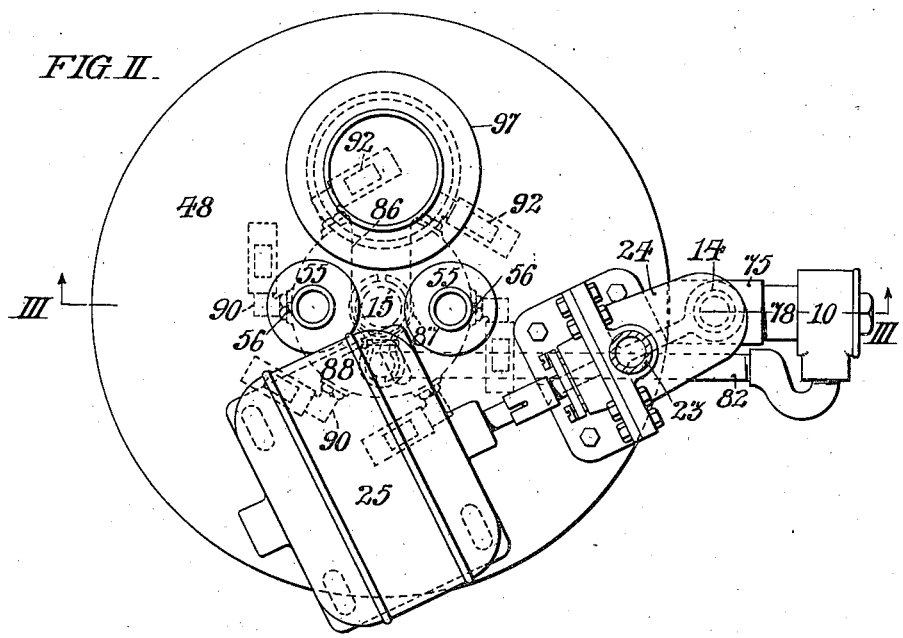
FIG. II.
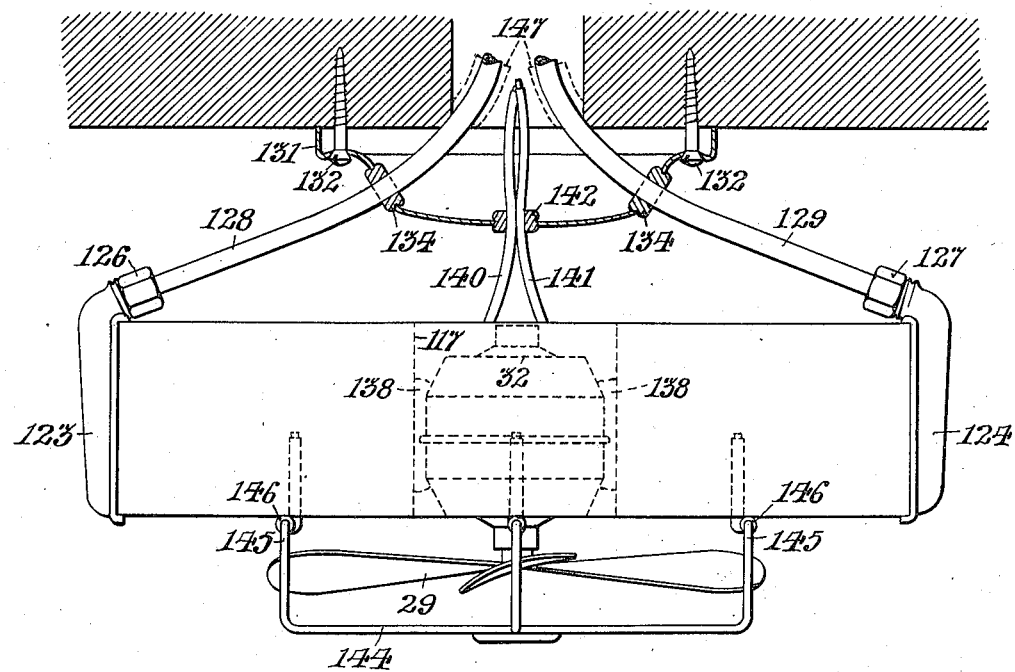
FIG. V.
INVENTOR:
VICTOR MAUCK, May 28, 1929.    V. MAUCK    1,715,040
COMBINATION HOUSE HEATING AND HOT WATER DISPENSING SYSTEM
Filed Sept. 24, 1926    4 Sheets-Sheet 3
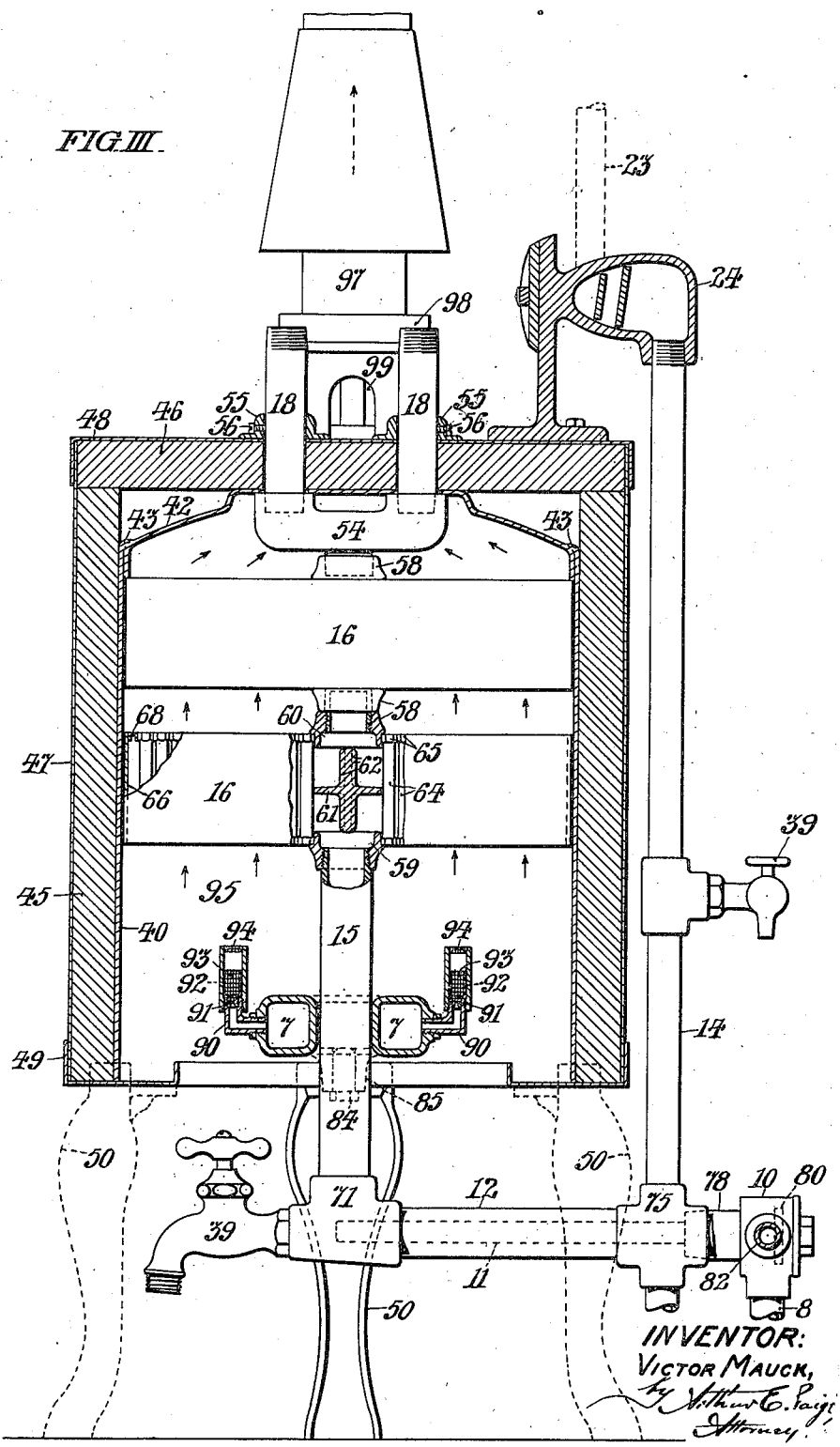

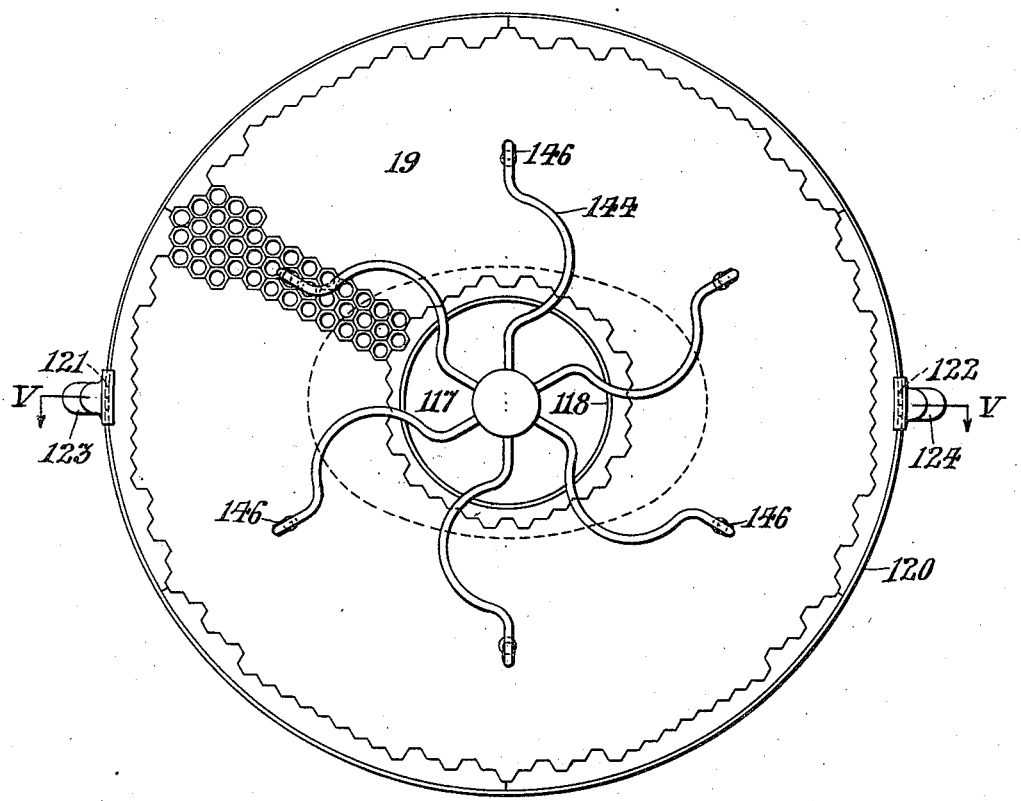

Patented May 28, 1929.

1,715,040

UNITED STATES PATENT OFFICE.

VICTOR MAUCK, OF MERION, PENNSYLVANIA.

COMBINATION HOUSE-HEATING AND HOT-WATER-DISPENSING SYSTEM.

Application filed September 24, 1926. Serial No. 137,506.

It is the object and effect of my invention to provide a single apparatus so organized that it may be installed in a dwelling to both heat the dwelling and supply it with hot water. Said combination house heating and hot water dispensing system is secluded from the atmosphere, as distinguished from the ordinary house hot water heating systems which include an expansion tank open to the atmosphere. As hereinafter described, a preferred embodiment of my invention includes a gas burner as the source of heat, in cooperative relation with a water container including a cellular structure formed of thin sheet metal walls arranged as separate passageways for water and the products of combustion from said burner; means arranged to supply said container with cold water under pressure from the municipal supply system, means arranged to supply water heated by said burner to dispensing faucets in the dwelling; and means including a conduit and a pump, arranged to forcibly circulate water from said container through a radiator or radiators, so disposed as to heat the various parts of said dwelling; such radiating means preferably including a similar cellular structure forming separate passageways for the hot water and air; and means for forcibly circulating the air through the radiator. In that preferred system, the pump and fans are arranged to be actuated by respective electric motors, and thermostatic means are provided to control the supply of gas to the burner in accordance with the temperature of the water, and to control the operation of the pump and fan motors, in accordance with the temperature of the atmosphere in the building, to maintain such temperature at a predetermined degree.

My invention includes the various novel features of construction and arrangement hereinafter more definitely specified. However, a house heating system including the specific form of gas consuming heater unit and radiating unit herein disclosed, is the subject matter of my copending application Serial No. 134,964, filed September 13, 1926 for Letters Patent of the United States.

In said drawings; Fig. I is a diagram showing a system embodying my invention.

Fig. II is a plan view of a heater and its appurtenances, conveniently embodying my invention.

Fig. III is a vertical sectional view of said heater, taken on the line III, III in Fig. II.

Fig. IV is an elevation of a radiator unit and its appurtenances.

Fig. V is a sectional view of said radiator unit, taken on the line V, V in Fig. IV.

Referring to Fig. I; the house or other building 1 comprising rooms or other inclosures 2 and 3, has, preferably in the cellar 4 thereof, the heater 6 inclosing the burner 7 supplied with gas from the conduit 8 under control of a thermostatically operative valve in the casing 10. Said valve casing carries the tubular thermostatic element 11 extending within the water conduit 12 which is connected with the pipes 14 and 15 through which water is circulated through the cellular heater units 16 and pipes 18 to radiator units 19, 20 and 21 from which the water is returned through pipes 23 to the pump 24 which is connected to said pipe 14 and arranged to be operated by the electric motor 25 under control of the thermostatically actuated switch 27. Said pump may be operated to circulate the water in either direction through the system; it being possible to burn more gas in the heater without melting the soldered joints thereof if the water is circulated upwardly through the heater; but downward circulation of the water through the heater effects a more efficient interchange of temperatures; the products of combustion passing from the heater being at lower temperature when the water is circulated downwardly.

Said radiator units 19, 20 and 21 are provided with respective rotary fans 29, 30 and 31 operated by electric motors 32, 33 and 34 under control of respective thermostatically operative electric switches 36, 37 and 38. Dispensing faucets 39 may be connected with either of said pipes 14 and 15; for instance, with the latter as shown in Fig. I.

The heater 6 shown in Figs. II and III comprises the cylindrical metal shell 40 and the circular head 42 permanently rigidly connected at the welded joint 43. Said shell is preferably provided with the cylindrical insulating jacket 45 and the insulating top member 46, with the outer cylindrical casing 47, top plate 48, and bottom plate 49; the latter being provided with three legs 50, preferably detachably connected therewith.

Said head 42 is conveniently flattened at its top and provided with openings for respective pipe nipples 18 which extend therethrough and through the insulating jacket 46 and top casing plate 48 in rigid relation with the Y-fitting 54 which is rigidly secured, in the position shown, by collars 55 encircling said nipples 18 and provided with set screws 56. Said fitting 54 serves to suspend the several heater sections 16 in rigid relation with the heater shell 40 in the position shown in Fig. III.

I find it convenient to effect such suspension by providing each of said sections 16 with an axial conduit fitting 58 comprising a circular inlet 59 at the bottom and a circular outlet 60 at the top thereof, with an intermediate baffle plate 61 connected with said inlet and outlet by triple flange members 62. The construction and arrangement of said axial fitting 58 are such that the water flowing into each heater section 16 is uniformly distributed laterally in the interstices between primarily cylindrical vertical flue tubes 64 which have their opposite ends 65 expanded to hexagonal form, so as to fit tightly together with their intermediate cylindrical portions in proper spaced relation to afford passageways between them. Said flue tubes 64 are assembled within the cylindrical circumferential band 66 of the unit 16, with a circular series of six filling pieces 68 at each of the axially opposite ends thereof, and such axial conduit fitting 58, flue tubes 64, circumferential band 66, and filling pieces 68 are permanently rigidly connected in the assembled position shown by alternately dipping the opposite ends thereof in molten metal such as half and half solder.

The lowermost heater section 16 has, pendent therefrom, the water inlet pipe 15 carrying, at the lower end thereof, the T-fitting 71 having one branch provided with the cock 39 through which water may be introduced to or drained from the heating system. The other branch of said T 71 is connected with the pipe 12 provided with the cross-fitting 75 at the lower end of the return water pipe 14. The thermostat 11 is encased by said pipe 12 and is rigidly connected with said cross-fitting 75 by its screw threaded outer end member 78 which is cylindrical and in unitary relation with the valve casing 10 inclosing the valve 80 which is arranged to control the passage of gas from the supply pipe 8 to the burner pipe 82, automatically, by expansion and contraction of said thermostat 11 in accordance with the temperature of the water passing through said pipe 12.

Said burner pipe 82 is conveniently provided with a rotary screw threaded nozzle 84 by which the effective area thereof may be varied, and said nozzle fits within the pendent inlet boss 85 of said burner manifold 7 and serves to support the latter which, as indicated in Fig. II, is conveniently formed with a radial opening 86 which will permit it to be readily applied to and removed from coaxial position with respect to said pipe 15. I find it convenient to prevent accidental displacement of said burner pipe 82 from proper relation with said water pipe 15, by means of the clamp 87 formed of strip metal and adjustable by the screw 88.

Said burner may be of any suitable construction, but I find it convenient to form it with a circular series of burner jets of the Bunsen type, comprising elbows 90 through which gas is supplied to the mixing tubes 91 having air inlets 92 provided with internal screens 93; the flame outlet of each of said burner mixing tubes 91 being provided with a screen 94. Such construction permits said burner tubes 91 to be adjusted and set at any angle with respect to the axis of the water pipe 15 and preferably obliquely transverse to said axis; so as to induce a swirling movement of the hot products of combustion in the combustion chamber 95 from which they escape through the flue tubes 64.

The products of combustion may be permitted to escape from said heater shell 40, by any suitable means; but I find it convenient to provide the flue outlet 97 provided with flue fittings 98 having air inlet openings 99 to cause induction of air into said flue 97 above said casing top plate 48.

Referring to Figs. IV and V; the radiator 19 comprises a honeycomb core of tubes similar to the heater sections 16 but has an axial opening 117 formed by the circular band 118 which is connected at its axially opposite ends in water tight relation with the hexagonal ends of the core tubes. However, the outer circumferential band 120 of said radiator is conveniently formed in two semi-circular sections which are recessed at their ends to form water ports 121 and 122 within conduits 123 and 124 which are connected in water tight relation with said band 120 by solder or otherwise. Said conduits 123 and 124 are respectively detachably connected, by couplings 126 and 127, with respective water pipes 128 and 129 through which water is circulated from the heater aforesaid through said radiator 19. Said radiator 19 is conveniently mounted in rigid relation with the ceiling of the room 2 or may be mounted in connection with any vertical wall, as indicated at 20 in Fig. I, by means of the hollow bracket 131, which is conveniently formed of pressed sheet metal attached to the building structure by screws 132. Said pipes 128 and 129 are preferably supported in said bracket 131 in soft rubber bushings 134, to avoid transmitting to the ceiling or wall the vibrations incident to the operation of the fan 29 which is arranged to be rotated by the electric motor 32 which is mounted in said opening 117; preferably within a soft rubber band 138 which also minimizes the transmission of vibrations from the fan and motor. Said motor may be conveniently connected with the house lighting system, or other source of energy, by means of the conductors 140 and 141, which both extend through the soft rubber bushing 142 in said bracket 131. Said fan 29 is preferably inclosed in the cage 144, which is conveniently detachably connected with the core of said radiator 19, by having its wire ends 145 covered with rubber tubes 146 and bent to bear upon the outer face of said core and extend within corresponding flue tubes thereof. Said cage is thus rendered readily detachable for access to said fan and motor, and the rubber tubes 146 normally frictionally secure it in position and prevent rattling.

It may be observed that the construction and arrangement of the radiator and its appurtenances above described are such that such radiators may be readily installed like an electric light fixture; the pipes 128 and 129 being conveniently formed of soft copper tubing which may be provided with coverings 147 of heat insulating material. The couplings 126 and 127 may be conveniently of what is known as the "pinch" type; the joints between them and said pipes being sealed by soft metal bands, encircling the pipes, which are pinched between axially opposite complementary conical seats respectively in said couplings and the conduits with which they are in screw threaded engagement.

I prefer to make all of the heater and radiator units above contemplated of thin sheet copper, for the reason that the latter has a coefficient of heat conductivity approximately six and one-half times greater than that of cast iron, which is ordinarily employed in heater and radiator sections of heating systems. The peculiar design and construction of my invention, and particularly with the use of such highly conductive material, not only permit the construction of a heating system of a given capacity at much less cost than the ordinary structures for that purpose, but also avoid the high cost of installation, which is characteristic of any heating system including ordinary wrought iron screw threaded pipes and couplings which require a high degree of skilled labor and expenditure of much time for their installation. Moreover, the use of heater and radiator units of cellular form, instead of the cast iron pipe form characteristic of ordinary heating systems, presents the water in such thin films for absorption of heat from the products of combustion as to very materially increase the efficiency of heat absorption of the water, in accordance with my invention, as compared with such ordinary systems. Furthermore, the forced circulation of both the water and the air with respect to the heating and radiating surfaces, renders the latter far more efficient than in the ordinary systems aforesaid. Consequently, the combination of the essential features of my invention in an organized heating system permits attainment of such greater heating efficiency than heretofore, that the cost of heating, with gas, in accordance with my invention, is less than the cost of heating with coal by the ordinary means aforesaid; which is a result which has never before been attained.

Although I prefer to use, as the source of heat, a gas burner including a plurality of respectively independent Bunsen jets, such as I have indicated; I do not claim such burners, and it is to be understood that any other suitable source of heat may be employed. For instance, a burner of the type shown in my copending application Serial No. 115,033 filed June 10, 1926, for Letters Patent of the United States, wherein the combustible mixture of gas and air is supplied to a plurality of burner orifices from a single mixing chamber, which is common to all of said orifices.

Although I prefer to employ a pump of the rotary screw type which I have indicated, because it permits the circulation of water therethrough by convection currents, or otherwise, when the pump is idle; I do not claim such pumps, and it is to be understood that any other suitable means for effecting forced circulation of the water may be employed. Moreover, although I prefer to effect forced circulation of the air with respect to the heating surfaces of the radiators aforesaid, by means of electrically actuated fans; other means for effecting such circulation may be employed and, in fact, such circulating means may be omitted and the air circulated by convection.

Therefore, I do not desire to limit myself to the precise details of construction and arrangement herein set forth, as it is obvious that various modifications may be made therein without departing from the essential features of my invention, as defined in the appended claims.

I claim:

1. In a combination house heating and hot water dispensing system which is secluded from the atmosphere, the combination with a gas burner; of a water container in cooperative relation with said burner; a thermostatic valve controlling the supply of gas to said burner and actuated by the temperature of the water in said container; a cold water conduit leading to said container; a hot water dispensing pipe leading from said container; a radiator; a fan affecting the circulation of air thru said radiator; an electric motor for said fan; thermostatic means controlling the operation of said fan motor and actuated by the temperature of the air local to said radiator; conduit means connecting said container with said radiator; a pump operable to circulate water from said container thru said conduit and radiator; and thermostatic means controlling the operation of said pump and actuated by the temperature of the air local to said radiator; whereby the heating effect of said burner is increased in accordance with decrease in the temperature of the water in said container in compensation for hot water dispensed from said system, and the temperature and rate of flow of both water and air are increased in accordance with decrease in the temperature of the atmosphere local to said radiator.

2. In a combination house heating and hot water dispensing system which is secluded from the atmosphere, the combination with a source of heat; of a water container in cooperative relation with said source of heat; a thermostatic valve controlling the supply of heat at said source of heat and actuated by the temperature of the water in said container; a cold water conduit leading to said container; a hot water dispensing pipe leading from said container; a radiator; a fan affecting the circulation of air thru said radiator; an electric motor for said fan; thermostatic means controlling the operation of said fan motor and actuated by the temperature of the air local to said radiator; conduit means connecting said container with said radiator; a pump operable to circulate water from said container thru said conduit and radiator; and thermostatic means controlling the operation of said pump and actuated by the temperature of the air local to said radiator; whereby the heating effect of said source of heat is increased in accordance with decrease in the temperature of the water in said container in compensation for hot water dispensed from said system, and the temperature and rate of flow of both water and air are increased in accordance with decrease in the temperature of the atmosphere local to said radiator, for maintaining a predetermined temperature of air local to said radiator.

In testimony whereof, I have hereunto signed my name at Conshohocken, Pennsylvania, this first day of September, 1926.

VICTOR MAUCK.